US008465796B2

(12) United States Patent
Choi et al.

(10) Patent No.: US 8,465,796 B2
(45) Date of Patent: Jun. 18, 2013

(54) METHOD OF MANUFACTURING UNIT CELL OF SOLID OXIDE FUEL CELL USING DECALCOMANIA PROCESS

(75) Inventors: Byung Hyun Choi, Seoul (KR); Mi Jung Jee, Gwangmyeong-si (KR); Seong Tae Park, Seoul (KR); Dae Jin Lee, Seosan-si (KR); Mi Jai Lee, Seoul (KR); Yuong Jin Kwon, Seoul (KR)

(73) Assignee: Korea Institute of Ceramic Engineering and Technology, Seoul (KR)

( * ) Notice: Subject to any disclaimer, the term of this patent is extended or adjusted under 35 U.S.C. 154(b) by 156 days.

(21) Appl. No.: 12/963,258

(22) Filed: Dec. 8, 2010

(65) Prior Publication Data

US 2011/0135813 A1     Jun. 9, 2011

(30) Foreign Application Priority Data

Dec. 9, 2009   (KR) ........................ 10-2009-0121928

(51) Int. Cl.
*B05D 1/12*     (2006.01)
(52) U.S. Cl.
USPC ........................................................ 427/115
(58) Field of Classification Search
USPC ........................................................ 427/115
See application file for complete search history.

(56) References Cited

U.S. PATENT DOCUMENTS

| 4,878,973 | A  | * | 11/1989 | Ohtake et al. .................... 156/85 |
| 7,485,385 | B2 | * | 2/2009  | Seccombe et al. ............. 429/469 |
| 7,550,025 | B2 | * | 6/2009  | Fukuda et al. .................... 55/523 |
| 2002/0146523 | A1 | * | 10/2002 | Devoe et al. .................... 428/34.7 |
| 2003/0232230 | A1 | * | 12/2003 | Carter et al. ...................... 429/32 |
| 2007/0248864 | A1 | * | 10/2007 | Yoshikata et al. ................. 429/32 |
| 2009/0326270 | A1 | * | 12/2009 | Mitchell et al. ................. 564/305 |

* cited by examiner

*Primary Examiner* — James Lin
*Assistant Examiner* — Austin Murata
(74) *Attorney, Agent, or Firm* — McDermott Will & Emery LLP

(57) ABSTRACT

A method of manufacturing a unit cell of a solid oxide fuel cell using a decalcomania process, in which an anode, electrolyte, cathode and interconnect are deposited on a substrate using the decalcomania process when the unit cell of the solid oxide fuel cell having a variety of shapes, such as a planar type, a horizontal pipe type, a tubular type, a segmented type, and the like, is manufactured. In manufacture of solid oxide fuel cells having a variety of shapes according to lamination and arrangement of unit cells, the components of each unit cell, such as the anode, the cathode, the electrolyte, the interconnect, and the like, may be deposited in a desired shape using the decalcomania process through deposition or coating, so that the components of the unit cell having a large scale or a complicated structure can be deposited without limit in size and shape, the thickness of the components of the unit cell can be easily controlled depending on the number of stacked transfer paper sheets, and a coating film can be formed on a substrate at a lower cost.

4 Claims, 6 Drawing Sheets

METHOD OF MANUFACTURING UNIT CELL OF SOLID OXIDE FUEL CELL USING DECALCOMANIA PROCESS

BACKGROUND

1. Technical Field

The present disclosure relates to a method of manufacturing a unit cell of a solid oxide fuel cell using a decalcomania process in which an anode, electrolyte, cathode, and interconnect are stacked on a substrate when manufacturing unit cells of solid oxide fuel cells having a variety of shapes, such as a planar type, a horizontal pipe type, a tubular type, a segmented type, and the like. More particularly, the present disclosure relates to a method of manufacturing a unit cell of a solid oxide fuel cell using a decalcomania process in which components of each unit cell, such as an anode, cathode, electrolyte, interconnect and the like, may be deposited in a desired shape by the decalcomania process through deposition or coating, in manufacture of solid oxide fuel cells having a variety of shapes according to lamination and arrangement of unit cells, so that the components of the unit cell having a large scale or complicated structure can be deposited without being limited in terms of size or shape, the thickness of the components in the unit cell can be easily controlled depending on the stacked number of transfer paper sheets, and a coating film can be formed on a substrate at lower cost.

2. Description of the Related Art

In a Solid Oxide Fuel Cell (hereinafter, referred to as "SOFC"), which has attracted attention as a next generation energy conversion device, a unit cell is generally constructed using zirconia as an electrolyte and includes an anode and a cathode (air electrode), and such unit cells are combined to form a stack. Advantageously, SOFCs can utilize hydrocarbons as well as hydrogen, eliminating the need for reformation of fuel gas, and have the highest known power generation efficiency. In addition, SOFCs are an environmentally friendly energy conversion device which does not release $NO_x$, $SO_x$, or the like.

SOFCs can be classified into a planar type, a horizontal pipe type, a tubular type, and a segmented type according to the shape of the unit cell and arrangement of stacks.

The planar type has a short current path, which advantageously results in higher efficiency than other types and higher power density than the tubular type. Since most of the components therein are ceramic composites, however, the planar type is brittle and subject to fracture. Moreover, the planar type is disadvantageous in that it is difficult to realize a large scale unit cell and to prevent gas from escaping due to structural characteristics of the unit cell.

On the contrary, the tubular type is close to commercial distribution, since the tubular type has structural characteristics providing high resistance to thermal impact while allowing easy sealing of the unit cell and easy manufacture of a large scale unit cell. However, the tubular type has low power density per unit area and requires a high-cost manufacturing process.

The horizontal pipe type is designed to solve the structural problems of the planar type and the tubular type. The horizontal pipe type is configured to solve both the problems of the planar type and the low power density of the tubular type.

In the segmented type, unit cells are connected in series on a substrate, thereby providing increased stacking efficiency, a reduction in current-resistance loss due to a short interval between the unit cells, and excellent mechanical strength. However, a long current path through an anode and a cathode in the segmented type disadvantageously causes internal resistance loss.

In manufacture of the SOFC unit cells having various configurations as described above, methods of depositing or coating the components of the unit cell on a substrate are divided as follows.

Gas phase coating or deposition includes a variety of processes, such as Electrochemical Vapor Deposition (EVD), Chemical Vapor Deposition (CVD), sputtering, plasma spraying, and the like. However, these processes have problems of limited starting materials and sample size, a slow film growth rate which makes it difficult to manufacture a thick sample, low adhesion to a substrate, and economical problems such as an increase in process cost due to expensive equipment, and the like.

Liquid phase coating or deposition is a relatively easy process and includes screen printing, tape casting, spin coating, dip coating, slip coating, electrochemical coating, and the like.

Inter alia, screen printing employing pastes is generally used. However, screen printing cannot be applied to either the tubular type or the horizontal pipe type due to a limit in size and shape of a coating substrate.

Therefore, the tubular type and the horizontal pipe type close to commercial distribution are generally manufactured by dip coating plasma spraying. However, dip coating plasma spraying has problems such as a difficulty in control of film thickness, complicated process, and high manufacturing costs.

To solve such problems, the inventor of the present disclosure suggests the use of a decalcomania process as a new film formation process, which is simple and can provide a thick or uniform film.

BRIEF SUMMARY

The present disclosure is conceived to solve the foregoing problems, and one aspect of the present disclosure provides a method of manufacturing a unit cell of a solid oxide fuel cell using a decalcomania process, in which components of each unit cell, such as an anode, cathode, electrolyte, interconnect, and the like, can be deposited in a desired shape using the decalcomania process, in manufacture of the unit cells for the SOFC through deposition or coating, so that the components of a large scale or complex unit cell can be deposited without limit in size and shape, the thickness of the components of the unit cell can be easily controlled depending on the stacked number of transfer paper sheets, and a coating film can be formed on a substrate at a lower cost.

In accordance with one aspect, a method of manufacturing a unit cell of a solid oxide fuel cell includes preparing pastes by mixing an epoxy-based binder with powders for components of the unit cell, including an anode, cathode, electrolyte and interconnect; screen-printing the pastes on a transfer paper sheet; and drying the transfer paper sheet on which the pastes are screen-printed, separating the anode, the cathode, the electrolyte and the interconnect from the transfer paper in distilled water, stacking the anode, the cathode, the electrolyte, and the interconnect on a substrate, followed by drying and sintering the anode, the cathode, the electrolyte, and the interconnect.

The screen-printing may include repeating paste transfer to deposit the pastes in a desired thickness in order to control deposition thickness of each of the anode, cathode, electrolyte and interconnect. The step of repeating paste transfer may include repeatedly drying and coating the anode, the cathode, the electrolyte, and the interconnect after the screen-printing. The step of preparing pastes may include mixing the powders for each of the anode, the cathode, the electrolyte and the interconnect with the epoxy-based binder at a ratio of 1:0.5 to 1:2.

The screen-printing may form a coating layer using an epoxy-based transfer coating solution. The substrate may be formed by mixing aluminum oxide, magnesium carbonate and activated carbon, drying the mixture, adding a binder, a release agent and a plasticizer to the dried mixture, followed by mixing, curing, and extrusion.

BRIEF DESCRIPTION OF THE DRAWINGS

The above and other features of the present disclosure will become apparent from the detailed description of exemplary embodiments in conjunction with the accompanying drawings.

DETAILED DESCRIPTION

Exemplary embodiments of the present disclosure will now be described in detail with reference to the accompanying drawings.

EXAMPLE 1

A unit cell is formed by depositing components of a unit cell using a decalcomania process, which includes coating the components over a transfer paper sheet.

Figure 1:
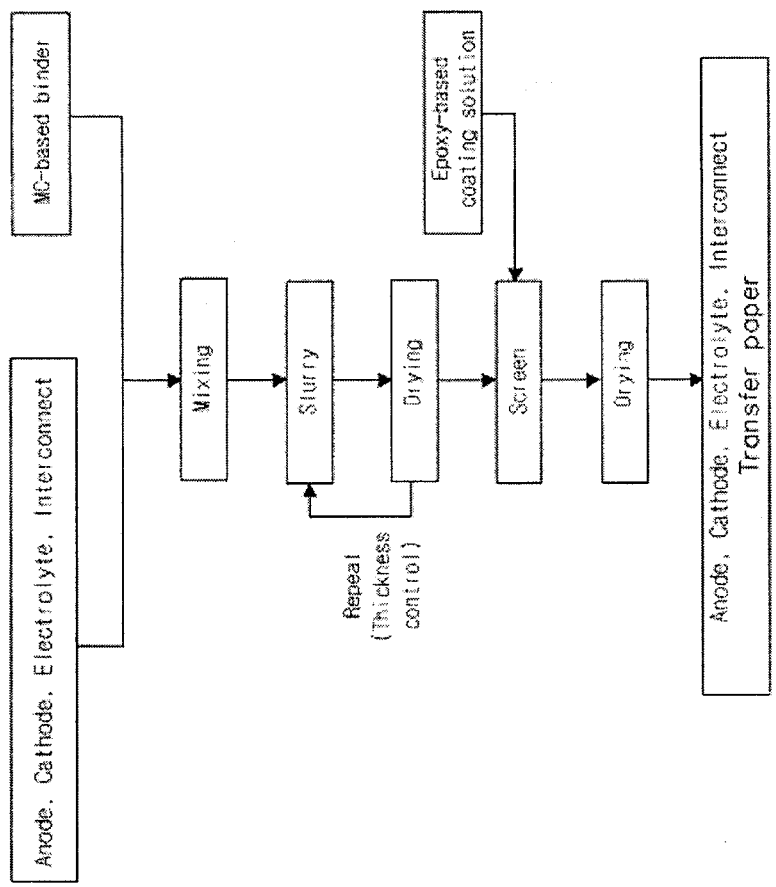
FIG. 1 is a flowchart of a process of manufacturing a transfer paper according to one exemplary embodiment of the present disclosure.

In order to manufacture sheets of transfer paper for components, slurries are prepared by sufficiently mixing powders for each of an anode (fuel electrode), cathode (air electrode), electrolyte and interconnect with an epoxy-based binder at a ratio of 1:0.5~1:2 using a 3-roll mill, as shown in FIG. 1. Then, the powders for each of the anode, the cathode, the electrolyte and the interconnect are deposited on a transfer paper sheet by screen printing.

Here, the thickness of each of the anode, the cathode, the electrolyte and the interconnect deposited on the transfer paper sheet by screen printing may be controlled according to the number of times being screen printed. To this end, coating is performed multiple times through repeated cycles of screen printing and drying.

A coating layer is formed by screen printing using an epoxy-based transfer coating solution to prevent damage of the transferred components while maintaining shapes of the transferred components when depositing the components on a substrate.

After drying the transfer paper sheet having the anode, the cathode, the electrolyte and the interconnect deposited thereon by screen printing, the cathode, the electrolyte and the interconnect are separated from the transfer paper sheet and deposited on a substrate, followed by drying at 80° C. for 1 hour and sintering, thereby forming component films for the unit cell.

Figure 2:
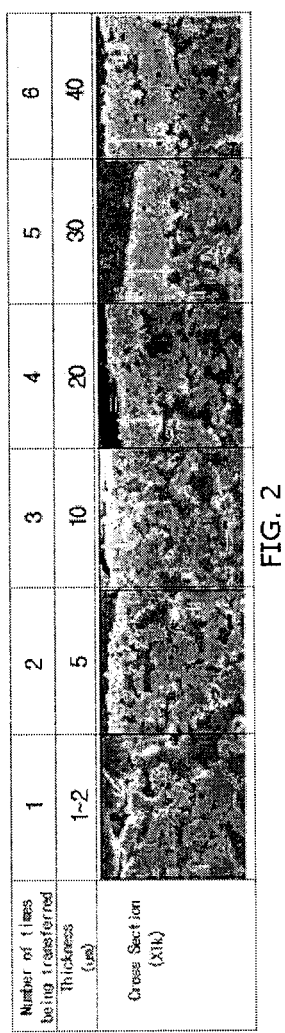
FIG. 2 is a view showing variation in the thickness of anodes as controlled through adjustment of the number of times that a transfer cycle is repeated.

FIG. 2 is a view showing variation in the thickness of anodes as controlled through adjustment of the number of times that a transfer cycle was repeated. In this example, the transfer cycle was repeated from 1 to 6 times. Observing the cross section of each sintered sample using a Scanning Electron Microscope (SEM), it can be seen that the coating layers were formed in various thicknesses from 1 to 40 μm.

EXAMPLE 2

Figure 3:
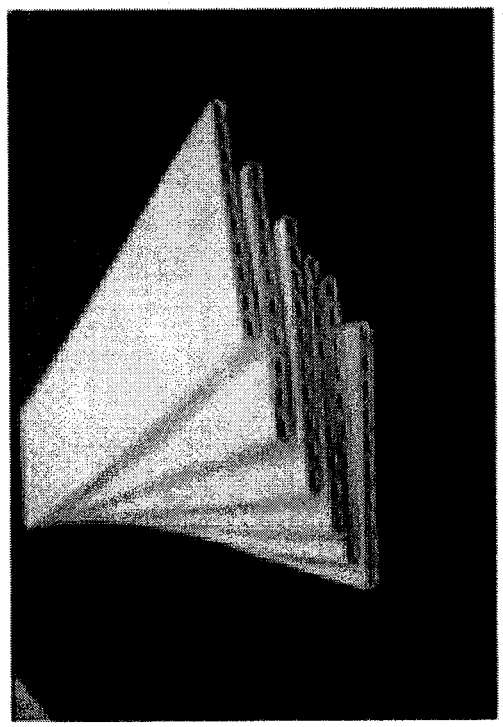
FIG. 3 is a view of porous ceramic substrates according to one embodiment of the present disclosure.

As shown in FIG. 3, a porous ceramic substrate was manufactured by mixing aluminum oxide ($Al_2O_3$), magnesium carbonate ($MgCO_3$), calcium carbonate ($CaCO_3$) or calcium fluoride ($CaF_2$), together with activated carbon PMMA as a pore-forming agent using a ball mill, drying the mixture, and adding a binder, a release agent and a plasticizer to the dried mixture, followed by mixing, curing, extrusion molding, drying, and sintering at a temperature of 1450~1600° C.

EXAMPLE 3

Application to segmented horizontal pipe type SOFC

Figure 4:
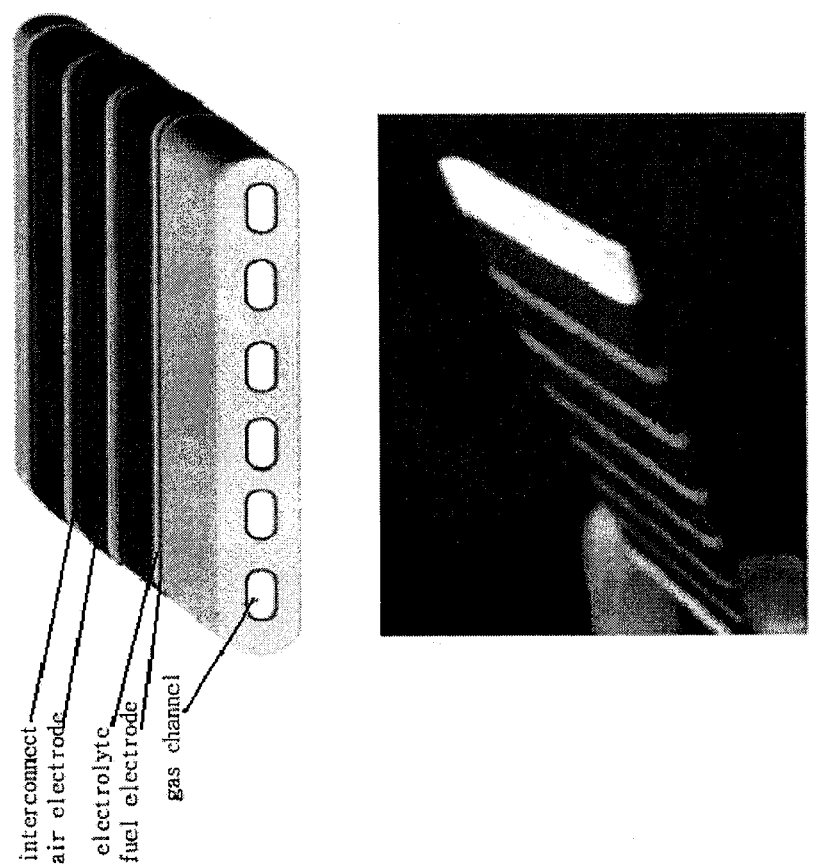
FIG. 4 is a view of a horizontal pipe type ceramic substrate, which includes components of an SOFC such as an anode, electrolyte, cathode and interconnect formed as segmented films thereon, according to one exemplary embodiment of the present disclosure.

An SOFC was manufactured by forming a segmented film having a desired thickness, as shown in FIG. 4, by applying the transfer paper sheet for the anode, electrolyte cathode and interconnect manufactured in Example 1 to the porous ceramic substrate manufactured in Example 2.

EXAMPLE 4

Application to planar type SOFC

Figure 5:
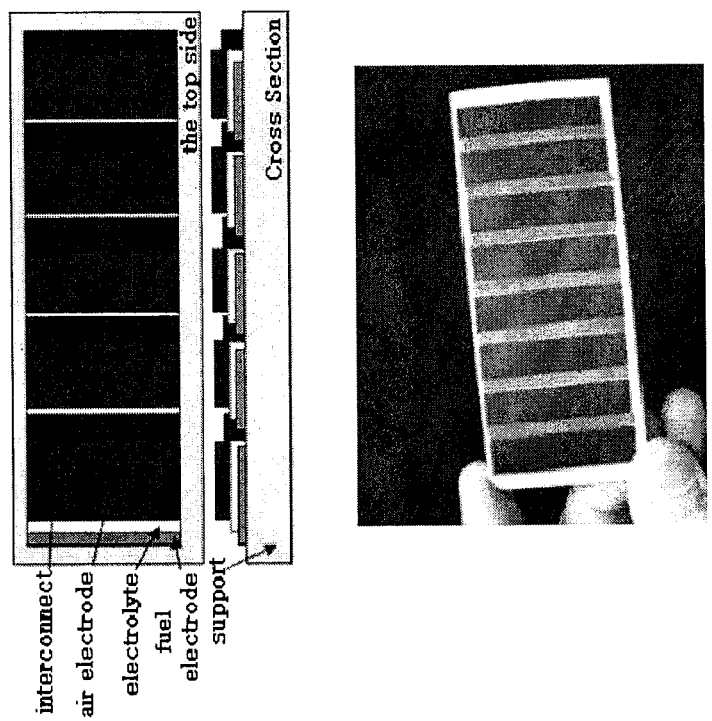
FIG. 5 is a view of a planar type ceramic substrate, which includes components of an SOFC such as an anode, electrolyte, cathode and interconnect formed as segmented films thereon, according to one exemplary embodiment of the present disclosure.

An SOFC was manufactured by forming a segmented film having a desired thickness, as shown in FIG. 5, by applying the transfer paper sheet for the anode, electrolyte cathode and interconnect manufactured in Example 1 to the flat porous ceramic substrate manufactured in Example 1.

EXAMPLE 5

Application to tubular type SOFC

Figure 6:
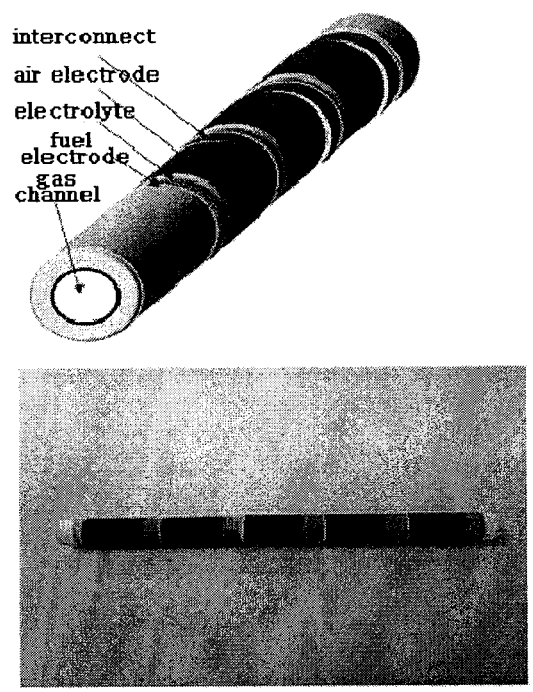
FIG. 6 is a view of a tubular ceramic substrate, which includes components of an SOFC such as an anode, electrolyte, cathode and interconnect formed as segmented films thereon, according to one exemplary embodiment of the present disclosure.

An SOFC was manufactured by forming a segmented film having a desired thickness, as shown in FIG. 6, by applying the transfer paper sheet for the anode, electrolyte cathode and interconnect manufactured in Example 1 to the tubular type porous ceramic substrate manufactured in Example 1.

As such, according to the exemplary embodiments, in manufacture of unit cells of an SOFC, the method employs the decalcomania process to fabricate the components of each unit cell, thereby enabling a reduction in manufacturing costs through elimination of expensive equipment. Further, the method enables manufacture of SOFCs having various shapes, such as the planar type, the tubular type, the horizontal pipe type, etc., in a desired size via deposition or coating, and allows easy control of the deposited thickness of each component based on the number of times being transferred for the components, thereby simplifying the manufacturing process.

In particular, the method can produce the horizontal pipe type SOFC by coating the components on a curved surface of the substrate using the decalcomania process, thereby noticeably increasing an effective area for electrodes.

Although some embodiments have been described in the present disclosure, it should be understood that the embodiments are given by way of illustration only and do not limit the scope of the present disclosure, and that various modifications and changes can be made by a person having ordinary knowledge in the art without departing from the spirit and scope of the present disclosure, which are limited only by the accompanying claims and equivalents thereof.

What is claimed is:

1. A method of manufacturing a unit cell of a solid oxide fuel cell using a decalcomania process, comprising:
    preparing pastes by mixing an epoxy-based binder with powders for components of the unit cell including an anode, cathode, electrolyte and interconnect;
    screen-printing the pastes on a transfer paper sheet; and
    drying the transfer paper sheet on which the pastes are screen-printed, separating the anode, the cathode, the electrolyte, and the interconnect from the transfer paper in distilled water, stacking the anode, the cathode, the electrolyte and the interconnect on a substrate, followed by drying and sintering the anode, the cathode, the electrolyte, and the interconnect,
    wherein the substrate is formed by mixing aluminum oxide, magnesium carbonate and activated carbon, drying the mixture, adding a binder, a release agent and a plasticizer to the dried mixture, followed by mixing, ripening, and extrusion molding.

2. The method according to claim 1, wherein the screen-printing comprises repeating paste transfer to deposit the pastes in a desired thickness in order to control a deposition thickness of each of the anode, the cathode, the electrolyte, and the interconnect, the repeating paste transfer comprising repeatedly drying and coating the anode, the cathode, the electrolyte, and the interconnect after the screen-printing.

3. The method according to claim 1, wherein the preparing pastes comprises the powders for each of the anode, the cathode, the electrolyte and the interconnect with the epoxy-based binder at a ratio of 1:0.5 to 1:2.

4. The method according to claim 1, wherein the screen-printing forms a coating layer using an epoxy-based transfer coating solution.

* * * * *